United States Patent [19]
Ohba et al.

[11] Patent Number: 5,233,924
[45] Date of Patent: Aug. 10, 1993

[54] SYNTHETIC PAPER FOR WRITING AND PRINTING

[75] Inventors: Yozo Ohba; Akira Akimoto; Tokumi Chiba, all of Ibaraki, Japan

[73] Assignee: Oji Yuka Goseishi Co., Ltd., Tokyo, Japan

[21] Appl. No.: 841,540

[22] Filed: Feb. 26, 1992

[30] Foreign Application Priority Data

Feb. 27, 1991 [JP] Japan .................................. 3-33212

[51] Int. Cl.[5] .......................... B41F 31/00; B32B 3/26
[52] U.S. Cl. ..................................... 101/483; 101/491;
428/315.5; 428/315.7; 428/315.9; 428/317.9;
428/516
[58] Field of Search ................ 101/483, 491;
428/315.5, 315.7, 315.9, 317.9, 516, 910

[56] References Cited

U.S. PATENT DOCUMENTS 4,318,950 3/1982 Takashi et al. ................... 428/143
4,582,753 4/1986 Duncan ............................ 428/317.9
4,927,695 5/1990 Ooms et al. ...................... 428/315.9

FOREIGN PATENT DOCUMENTS 2161723A 1/1986 United Kingdom .

Primary Examiner—William J. Van Balen
Attorney, Agent, or Firm—Sughrue, Mion, Zinn, Macpeak & Seas

[57] ABSTRACT

Pencil writable and printable synthetic paper comprising a finely porous polyolefin film layer having an opacity of at least 80% obtained by stretching a polyolefin film containing from 8 to 65% by weight of an inorganic fine powder having on one or both sides thereof a stretched ethylene-vinyl alcohol copolymer film layer, at least one of the stretched ethylene-vinyl alcohol copolymer film layers having a coat layer thereon. When printed, the stretched ethylene-vinyl alcohol copolymer film layer prevents hydrocarbon solvents present in printing inks from penetrating into the polyolefin film layer to eliminate local surface unevenness and curling.

7 Claims, 1 Drawing Sheet

SYNTHETIC PAPER FOR WRITING AND PRINTING

FIELD OF THE INVENTION

This invention relates to a synthetic paper with excellent pencil writability and printability. More particularly, it relates to a synthetic paper which has sufficient opaqueness for writing with a pencil and which, when printed by offset printing or gravure printing and piled one on another, does not become uneven or curl due to penetration of solvents of printing inks.

BACKGROUND OF THE INVENTION

A synthetic paper obtained by stretching a polypropylene film containing from 8 to 65% by weight of an inorganic fine powder has recently been developed and is in practical use as disclosed in JP-B-46-40794 (corresponding to U.S. Pat. Nos. 4,318,950 and 4,075,050), JP-A-56-141339 and JP-A-57-181829 (the term "JP-B" as used herein means an "examined published Japanese patent application", and the term "JP-A" as used herein means an "unexamined published Japanese patent application").

Synthetic paper of this type has a microstructure in which fine voids are formed around inorganic fine powder and a vast number of streaking cracks are formed on the surface. Synthetic paper having a structure such as this is not only lightweight but has excellent printing ink receptivity, pencil writability, water resistance, etc.

Various improvements have hitherto been made in the above-described synthetic paper. For example, an aqueous solution of an anti-electrostatic acrylic copolymer, polyethyleneimine, etc. is coated thereon at a dry spread of from 0.005 to 1 g/m$^2$, followed by drying to produce improved offset printability, as disclosed, e.g., in JP-A-50-10624, JP-A-57-149363, and JP-A-61-3748.

A polypropylene film without any inorganic fine powder on the surface of the synthetic paper to provide high-gloss and printable synthetic paper has been developed (refer to JP-A-61-3748) or a uniaxially stretched styrene-polypropylene copolymer film containing 0 to 3% by weight of an inorganic fine powder on the surface of the synthetic paper, with the styrene-polypropylene copolymer film having a thickness one-tenth to equal to the average particle size of said inorganic fine powder to thereby prevent difficulties arising from paper dust is known as disclosed in JP-A-62-249741.

These synthetic papers possess characteristics which are not possessed by conventional paper such as water resistance, chemical resistance and mechanical strength yet they have conventional paper properties such as whiteness, opaqueness and smoothness and are used in posters, calendars, books, maps, labels, and various advertising media, neatly printed in full color by offset printing, gravure printing, screen printing, and the like.

However, in spite of the above-mentioned superiority, polypropylene-based synthetic paper has a disadvantage in that hydrocarbon compounds, particularly hydrocarbon solvents contained in quantity in inks used in offset printing, gravure printing and screen printing swells the polypropylene resin and curling occurs. Eventually this results in an unevenness due to swelling that makes the printed matter invaluable.

The swelling of synthetic paper with solvents is explained below in detail taking offset inks for instance into consideration. Because multicolor printing can be conducted with ease, offset printing is used for printing on art paper, fine paper, coated paper, polyethylene terephthalate films, polyvinyl chloride films, etc. General purpose offset inks (hereinafter referred to as GP offset inks) usually employed in offset printing comprise the following basic components in the compounding ratio shown in Table 1 below.

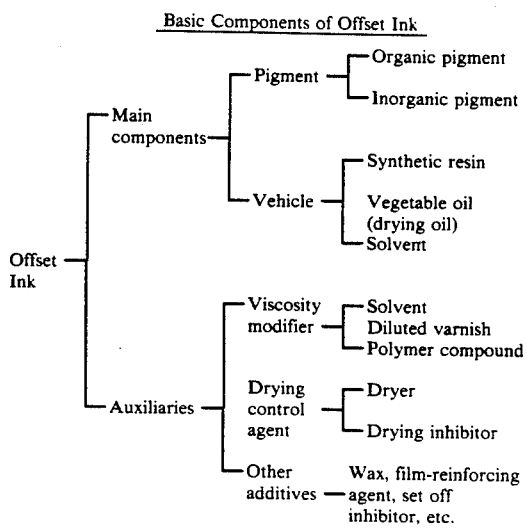

Basic Components of Offset Ink

The composition of a special offset ink developed for non-absorbing materials (hereinafter described) is also shown in Table 1 below.

TABLE 1

| Component | GP Offset Ink (parts by weight) | Offset Ink for Non-absorbing Materials (parts by weight) |
|---|---|---|
| Pigment | 15 to 50 (20) | (25) |
| Resin | 25 to 30 (30) | (30) |
| Drying oil | 10 to 15 (10) | (34) |
| High-boiling petroleum solvent | 20 to 45 (35) | (5) |
| Dryer | 0.5 to 2 (1) | (2) |
| Others | 2 to 5 (4) | (4) |
| Total weight | 100 | 100 |

The numbers in parentheses indicate the composition of an example of commercially available inks.

In order to reduce drying time, a drying oil compounded with a resin and a mineral oil (high-boiling petroleum solvent) has been used as a vehicle to provide a quick-drying GP offset ink.

Where synthetic paper comprising a stretched polyolefin film containing an inorganic fine powder, e.g., the film disclosed in JP-B-46-40794, JP-A-62-227933, JP-A-61-3748, and JP-A-60-79951, is printed with the above-described GP offset ink, the polyolefin swells due to the solvent present in the ink, particularly high-boiling petroleum solvents (e.g., mineral oils), and the printed synthetic paper suffers from a so-called solvent attack, i.e., local unevenness of the surface or curling as a whole. Thus, the practical application of such GP offset inks to offset printing on polyolefin films is difficult.

In order to avoid such a solvent attack, a special offset ink with a reduced amount of high-boiling petroleum solvent as shown in Table 1 above is now employed for particular use on non-absorbing materials such as polyolefin films.

However, where printing is carried out by using the above-described special offset ink for polyolefin films, printers encounter difficulties in controlling the balance between the amount of damping water and that of the ink as compared with use of GP offset inks and are also confronted with a problem of variation in ink viscosity on printing machines, which deteriorates workability. For these reasons, printers are unwilling to use these kind of printing inks and, as a result, printers and ink manufactures who practice printing of synthetic papers are naturally limited. Therefore, development of polyolefin synthetic paper on which GP offset inks can be used without problems has been desired.

Since in practice general printers carry out, as a regular routine, offset printing on pulp paper, such as fine paper and coated paper, with a GP offset ink, they must change the GP offset ink for the special offset ink for non-absorbing materials each time polyolefin synthetic paper is to be printed. Considering much time and labor are required for the ink change, general printers avoid printing of polyolefin synthetic paper, and this has interfered with the spread of offset printing on polyolefin synthetic paper.

SUMMARY OF THE INVENTION

An object of the present invention is to provide synthetic paper where unevenness or overall curling when offset printed in multicolor even with a GP offset ink hardly occurs and which also has excellent pencil writability.

As a result of extensive investigations, it has now been found that the above object of the present invention is accomplished by synthetic paper comprising a finely porous polyolefin film having an opacity of at least 80% and a stretched ethylene-vinyl alcohol copolymer film which prevents the solvent of a GP offset ink from penetrating into said polyolefin film on one or both sides thereof, with at least one of the stretched ethylene-vinyl alcohol copolymer films on which offset printing is to be done having a pigment coat (coat layer) thereon. The present invention has been completed based on this finding.

The present invention thus provides synthetic paper with excellent pencil writability and printability comprising (a) a finely porous polyolefin film layer having an opacity of at least 80% which is obtained by stretching a polyolefin film containing from 8 to 65% by weight of an inorganic fine powder, (b) a stretched ethylene-vinyl alcohol copolymer film layer on one or both sides of the polyolefin film layer (a), and (c) a coat layer on at least one of the stretched ethylene-vinyl alcohol copolymer film layers (b).

DETAILED DESCRIPTION OF THE INVENTION

Figure 1:
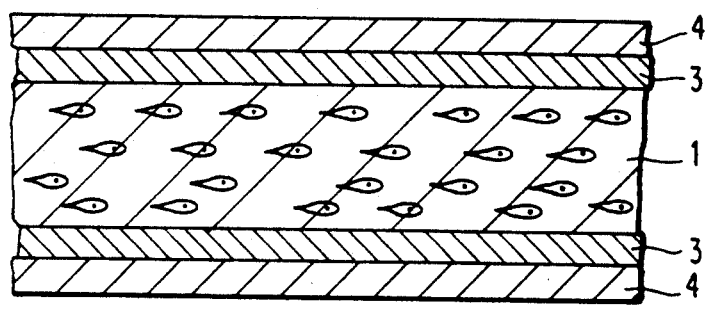
FIGS. 1 and 2 each illustrate an enlarged cross section of the synthetic paper according to the present invention.
Figure 2:
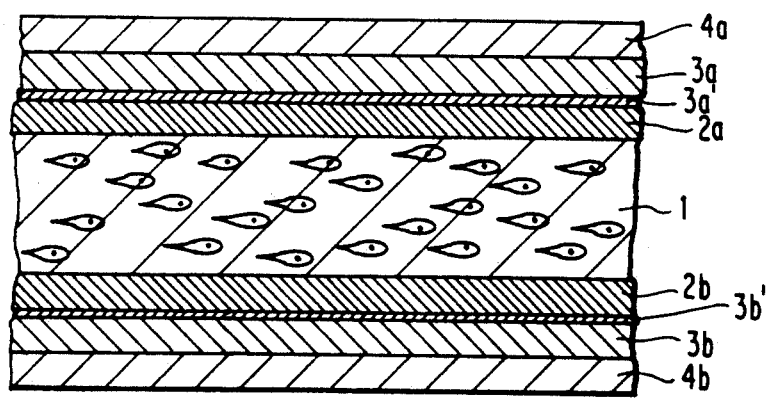

The synthetic paper having excellent printability according to the present invention may have a five-, six-, seven-, eight-, nine-, ten- or even more multi-layered structure and includes a laminate film as shown in FIG. 1 comprising base layer 1 comprising a finely porous polyolefin film having an opacity of at least 80% which is obtained by stretching a polyolefin film containing from 8 to 65% by weight of an inorganic fine powder, stretched ethylene-vinyl alcohol copolymer film 3 laminated on one or both sides of base layer 1 via an adhesive or by fusion bonding, and coat layer 4 laminated on at least one of the stretched ethylene-vinyl alcohol copolymer films; a laminate film as shown in FIG. 2 comprising a composite film support which comprises base layer 1 comprising a biaxially stretched thermoplastic resin film containing from 3 to 40% by weight of an inorganic fine powder having laminated on one or both sides thereof paper-like surface layer 2a and/or a paper-like back layer 2b comprising a uniaxially stretched polyolefin resin film containing from 8 to 65% by weight of an inorganic fine powder, uniaxially stretched ethylene-vinyl alcohol copolymer surface layer 3a or layers 3a and 3b laminated on paper-like layer 2a or both of paper-like layers 2a and 2b via adhesive resin layer 3a' or layers 3a' and 3b', and coat layer 4a or layers 4a and 4b laminated on at least one of stretched ethylene-vinyl alcohol copolymer films 3a and 3b; a laminate film of FIG. 2 additionally having another resin layer 5 between paper-like layer 2a or 2b and base layer 1; and a laminate film of FIG. 1 or 2 additionally having another resin layer 6 between the stretched ethylene-vinyl alcohol copolymer film and the coat layer.

Polyolefins which can be used as a material of the finely porous polyolefin film include polyolefin resins, e.g., polyethylene, polypropylene, an ethylene-propylene copolymer, polybutene, polystyrene, an ethylene-vinyl acetate copolymer, an ethylene-acrylic ester copolymer, a styrene-propylene copolymer, a styrene-ethylene copolymer, and maleic anhydride-grafted polypropylene. These polyolefin resins may be used either alone or in combinations of two or more thereof.

Preferred finely porous polyolefin films are a uniaxially or biaxially stretched film of an olefin homo- or copolymer comprising 50% by weight or more of ethylene and/or propylene and containing from 8 to 65% by weight of an inorganic fine powder and/or an organic filler. Commercially available polyolefin synthetic papers, such as Yupo FPG, Yupo KPK, Yupo TPG, Yupo GFG, Yupo CFG, and Yupo SGG (all produced by Oji Yuka Goseishi Co., Ltd.) can be utilized as such a polyolefin base layer.

The inorganic fine powder which can be incorporated into the polyolefin resin to provide a finely porous film includes talc, silica, diatomaceous earth, calcium carbonate, magnesium carbonate, barium sulfate, and titanium oxide each having a particle size of from 0.03 to 16 $\mu$m.

The ethylene-vinyl alcohol copolymer which can be used in the stretched ethylene-vinyl alcohol copolymer film serving to prevent penetration of printing ink solvents includes a hydroxyl-modified ethylene-vinyl acetate copolymer obtained by modifying an ethylene-vinyl acetate copolymer having an ethylene content of from 30 to 70 mol % by saponifying at least 90%, and preferably 99% or more, of the acetyl groups thereof to convert them to hydroxyl groups as described, e.g., in U.S. Pat. No. 3,419,654.

If desired, the other resin layer 5 comprising a thermoplastic resin may be additionally provided as stated above for the purpose of improving the mechanical strength of the finely porous polyolefin film having an opacity of at least 80% or providing the synthetic paper with various properties required for synthetic paper. Examples of useful thermoplastic resins as resin layer 5 include polyolefin resins, e.g., polyethylene, polypropylene, an ethylene-propylene copolymer, an ethylene-vinyl acetate copolymer and poly(4-methylpentene-1), polystyrene, polyamide, polyethylene terephthalate, either alone or in combination thereof. From the standpoint of water resistance and chemical resistance, preferred thermoplastic resins are polypropylene, polyethylene, an ethylene-propylene copolymer, and mixtures thereof.

It is preferable to provide an adhesive resin layer between the finely porous polyolefin film and the stretched ethylene-vinyl alcohol copolymer film and between the stretched ethylene-vinyl alcohol copolymer film and the coat layer. Useful adhesive resins include graft-modified olefin polymers obtained by grafting an unsaturated carboxylic acid or a derivative thereof to an olefin polymer. Examples of olefin polymers which can be modified include polyethylene, polypropylene, polybutene, poly(4-methylpentene-1), and an ethylene-propylene copolymer. Examples of grafting monomers include unsaturated carboxylic acids, e.g., acrylic acid, methacrylic acid, maleic acid, fumaric acid, and itaconic acid, and derivatives thereof, e.g., acid anhydrides, esters, amides, imides and metal salts. Specific examples of suitable carboxylic acid derivatives are maleic anhydride, itaconic anhydride, citraconic anhydride, methyl acrylate, ethyl acrylate, methyl methacrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, maleinamic acid, maleinamide, maleic acid N-monoethylamide, maleic acid N,N-diethylamide, maleic acid N-monobutylamide, maleic acid N,N-dibutylamide, fumaramic acid, fumaramide, fumaric acid N-monoethylamide, fumaric acid N,N-diethylamide, fumaric acid N-monobutylamide, fumaric acid N,N-dibutylamide, maleimide, N-butylmaleimide, N-phenylmaleimide, sodium acrylate, sodium methacrylate, potassium acrylate, and potassium methacrylate.

These grafting monomers are grafted in an amount usually of from 0.005 to 10% by weight, and preferably from 0.01 to 5% by weight, based on the olefin polymer.

The coat layer provided to improve drying properties of offset inks generally includes a pigment coat layer commonly employed in coated paper. The pigment coat layer usually comprises, as main components, from 50 to 90% by weight of an inorganic fine powder and from 10 to 50% by weight (on a solid basis) of an emulsion type or aqueous solution type resin binder. If desired, the coat layer may further contain from 0.05 to 5% by weight of an antistatic agent such as nonionic surfactant, cationic surfactant, betaine, polyethyleneimine, epichlorohydrine adduct of polyamine-polyamide, ethylene-urea, and polyacrylic ether containing guaternary N+atom.

Examples of suitable inorganic fine powders which can be used in the coat layer include calcium carbonate, satin white, silica, titanium oxide, alumina, clay, talc, aluminum hydroxide, zinc oxide, iron oxide, and other pigments. The inorganic fine powder preferably has a particle size of not more than 15 μm, and particularly from 0.1 to 10 μm. In addition, organic colorants or polystyrene fine particles called plastic pigments may also be incorporated into the coat layer.

Examples of suitable resin binders which can be used in the coat layer include resin emulsions, e.g., an ethylene-vinyl acetate copolymer emulsion, an ethylene-vinyl acetate-vinyl chloride copolymer emulsion, a vinyl acetate-acrylic ester copolymer emulsion, a styrene-butadiene rubber emulsion, a cold-crosslinking acrylic resin aqueous emulsion, and a urethane resin aqueous emulsion; and aqueous solutions of water-soluble high polymers, e.g., starch, carboxymethyl cellulose, and polyvinylpyrrolidone. These binders may be used either individually or in combination of two or more thereof.

For the purpose of facilitating coating, solvents can be incorporated in small amounts into the coating composition. The coat layer may further contain colorants, preservatives, fluidity improving agents, wetting agents, film formation aids, defoaming agents, plasticizers, etc.

The coating composition can be coated using any known coating method. After the coated polyolefin film is dried at the temperature of 70° to 120° C., the above-described coat layer is formed on at least one side thereof.

The synthetic paper having excellent pencil writability and printability can be obtained by coating the above-described coating composition for a coat layer on a laminate base film prepared chiefly by processes (1) to (4) described below.

Process (1)

A polyolefin composition comprising from 35 to 92% by weight of a polyolefin and from 8 to 65% by weight of an inorganic fine powder and an ethylene-vinyl alcohol copolymer are separately melt-kneaded in each extruder, supplied to the same extrusion die, and co-extruded into a two layer laminate film, and the extruded laminate film is stretched in both longitudinal and transverse directions at temperatures lower than the melting point of the polyolefin.

Process (2)

A polyolefin composition comprising a polyolefin and from 8 to 65% by weight of an inorganic fine powder and an ethylene-vinyl alcohol copolymer are separately melt-kneaded in each extruder, supplied to the same extrusion die, and co-extruded together and laminated with a uniaxially oriented film (base layer) obtained by unidirectionally stretching a thermoplastic resin film containing from 3 to 40% by weight of an inorganic fine powder at a stretching temperature lower than the melting point of the thermoplastic resin, to obtain a fusion-laminated film composed of the uniaxially oriented thermoplastic resin film having laminated on one or both sides thereof the polyolefin film and the ethylene-vinyl alcohol copolymer film in this order. The resulting laminate film is then stretched in the direction perpendicular to the stretching direction of the unidirectionally oriented thermoplastic resin film at a temperature lower than the melting point of the polyolefin. A laminate base film in which the paper-like layer(s) are uniaxially oriented and have a number of microvoids, the ethylene-vinyl alcohol copolymer layer is uniaxially oriented, and the base layer is biaxially oriented is obtained.

Process (3)

A polyolefin composition comprising a polyolefin and from 8 to 65% by weight of an inorganic fine powder, an adhesive resin, and an ethylene-vinyl alcohol copolymer are separately melt-kneaded in each extruder, supplied to the same extrusion die, and coextruded together with a uniaxially oriented film (base layer) obtained by unidirectionally stretching a thermoplastic resin film containing from 3 to 40% by weight of an inorganic fine powder at a stretching temperature lower than the melting point of the thermoplastic resin to obtain a fusion-laminated film composed of the uniaxially oriented thermoplastic resin film having laminated on one or both sides thereof the polyolefin film, the adhesive resin layer, and the ethylene-vinyl alcohol copolymer film in this order. The resulting laminate film is then stretched in the direction perpendicular to the stretching direction of the unidirectionally oriented thermoplastic resin film at a temperature lower than the melting point of the polyolefin. There is obtained a laminate base film in which the paper-like layer(s) are uniaxially oriented and have a number of microvoids, the ethylene-vinyl alcohol copolymer layer is uniaxially oriented, and the base layer is biaxially oriented.

Process (4)

A stretched ethylene-vinyl alcohol copolymer film having a stretch ratio of, preferably, from 3.5 to 10 is adhesion-laminated on one or both sides of commercially available finely porous polyolefin type synthetic paper (e.g., Yupo FPG, KPK, GFG or SGG all produced by Oji Yuka Goseishi Co., Ltd.) via a polyurethane or polyester type primer.

The stretching in Processes (1) to (3) is preferably carried out at a stretch ratio of from 4 to 10 in either direction. The stretching temperature ranges from 150° to 162° C. for a propylene homopolymer (melting point: 164°–167° C.) as a polyolefin resin, or from 110° to 120° C. for high-density polyethylene (melting point: 121°–124° C.) as a polyolefin resin. The stretching speed usually ranges from 50 to 350 m/min.

It is preferable that the stretch ratio, stretching temperature, and stretching speed, and the inorganic fine powder content of the polyolefin composition is so selected that the microvoid volume (%) of the finely porous polyolefin film as represented by the following equation falls within a range of from 20 to 60%, and preferably from 25 to 45% and that the finely porous polyolefin film may have a degree of smoothness (JIS P-8119; Bekk's index) of not more than 2,000 seconds.

$$\text{Microvoid volume } (\%) = \{(V_0 - V_1)/V_0\} \times 100$$

wherein $V_0$ is an average density of the unstretched polyolefin film; and $V_1$ is a density of the stretched polyolefin film.

When the above-described conditions of microvoid volume and surface smoothness are achieved, the synthetic paper exerts moderate cushioning properties on contact with a printing roller during printing so that a printing ink is smoothly transferred to the synthetic paper to provide beautiful prints. If the microvoid volume is too small, opacity is reduced which impairs the paper-like appearance of the synthetic paper. Also, the cushioning effect is insufficient, causing ink deficiency or insufficient ink transfer due to the shock on contact with a printing roller, and this results in printability deterioration. If the microvoid volume is too large, the support has poor strength, and the resulting synthetic paper is difficult to feed on the printing line.

The finely porous polyolefin film has a thickness usually of from 40 to 500 μm, and preferably of from 60 to 250 μm.

The ethylene-vinyl alcohol copolymer film is more effective to prevent penetration of hydrocarbon solvents and to enhance surface gloss to improve the printing appearance when used as a uniaxially or biaxially stretched film than as a non-stretched film.

The ethylene-vinyl alcohol copolymer film has a thickness usually of from 3 to 30 μm, and preferably of from 5 to 15 μm, and the adhesive resin layer, if present, has a thickness usually of from 5 to 20 μm. If the thickness of the stretched ethylene-vinyl alcohol copolymer film is less than 3 μm, the effect of preventing penetration of hydrocarbon solvents is small, and the resulting synthetic paper tends to curl after printing.

In order to improve the adhesion between the thus prepared laminate base film and a coat layer or in order to provide the synthetic paper with antistatic properties, the surface of the base film on which a coat layer is to be formed may be treated with a primer, if desired.

Examples of suitable primers include polyethyleneimine, poly(ethyleneimineurea), an ethyleneimine adduct of polyamine-polyamide, an epichlorohydrin adduct of polyamine-polyamide, and a tertiary or quaternary nitrogen-containing acrylic polymer. The primer may contain an alkali metal salt or an alkaline earth metal salt such as $Na_2SO_4$, $K_2SO_4$, $Na_2CO_3$, $CaSO_4$, $MgSO_4$, and $Ca(NO_3)_2$ for enhancing the static charge prevention effect.

The primer can be coated by means of a roller coater, a spray coater, a brush, etc. The primer coating amount ranges from 0.01 to 10 g/m², and preferably from 0.01 to 2 g/m², on a solid basis.

The above-described coating composition for a coat layer is then coated on the thus prepared laminate base film by means of a roller coater, a spray coater, a brush, etc. to a coating amount of from 2 to 25 g/m², and preferably from 4 to 20 g/m², on a solid basis. The coat layer has a thickness usually of from 3 to 30 μm, and preferably from 5 to 25 μm.

The synthetic paper according to the present invention with excellent pencil writability and printability can be printed with a printing ink, such as an offset ink.

Printing inks used, for example, in offset printing basically comprise, as main components, pigments with vehicles with auxiliaries including viscosity modifiers, drying controlling agents, and the like as previously described.

The pencil-writable and printable polyolefin synthetic paper according to the present invention can be neatly printed using special offset inks for non-absorbing materials as well as GP offset inks.

Specific examples of suitable pigments of printing inks include azo pigments, e.g., lithol red and benzidine yellow; lake pigments, e.g., permanent green, permanent rhodamine, permanent blue, and Lake Red C; organic pigments, e.g., Brilliant Carmine 6B and Phthalocyanine Blue; and inorganic pigments, e.g., alumina, barium sulfate, red iron oxide, chrome yellow, Prussian blue, titanium white, and carbon black.

Suitable vehicles include synthetic resins, vegetable oils (drying oils), and solvents. Specific examples thereof are linseed oil type vehicles, e.g., linseed oil and stand oil; alkyd type vehicles, e.g., drying oil-modified alkyd resins; and quick-drying resin type vehicles mainly comprising a resin varnish prepared by dissolving a rosin-modified phenol resin in a mixture of linseed oil and tung oil or a low-viscosity linseed oil varnish and controlling the viscosity by addition of petroleum fractions having a narrow boiling point range.

Viscosity controlling agents include solvents, diluted varnishes, and polymer compounds.

Drying controlling agents include dryers and drying inhibitors.

Other auxiliary components include waxes, film-reinforcing agents, and set off inhibitors.

Printing of the polyolefin synthetic paper of the present invention with these printing inks ca be carried out in a conventional manner generally employed for offset printing using commercially available offset printing machines.

The polyolefin synthetic paper of the present invention can be employed not only in offset printing as described above but also with other printing techniques, such as gravure printing, flexographic printing, screen printing, seal printing, and letterpress printing. When applied to offset printing or screen printing, in particular, the synthetic paper provides printed material of beautiful appearance, such as labels, posters, calendars, and advertizing displays, which do not curl even if the printing ink used contains a large amount of hydrocarbon solvents.

The ethylene-polyvinyl alcohol copolymer layer is formed on either one or both sides of the finely porous polyolefin film. Provision of only one ethylene-polyvinyl alcohol copolymer layer is sufficient where sheets of the synthetic paper immediately after being printed are not stacked on each other as in screen printing or gravure printing. On the other hand, where the printed sheets of synthetic paper are stacked on each other as in offset printing, use of the ethylene-polyvinyl alcohol copolymer film on both sides of the polyolefin film, whereby the solvent in the printing ink of the lower printed sheet is prevented from penetrating into the upper printed sheet to thereby prevent unevenness or curling, is preferred.

The present invention is now illustrated in greater detail by the following Examples, but it should be understood that the present invention is not to be construed as being limited thereto. All the parts, percents, and ratios are by weight unless otherwise indicated.

In Examples and Comparative Examples, curling, printability, pencil writability and opacity of the synthetic paper produced were evaluated in accordance with the following test methods.

1) Curling

Synthetic paper was offset printed using an RI printing machine (manufactured by Akira Seisakusho) and an offset ink "TK Newmark V" (indigo blue) manufactured by Toyo Ink Mfg. Co., Ltd to an ink coating amount of 2.0 g/m$^2$ (wet basis) and allowed to stand at room temperature for 24 hours to dry. The printed sheet was cut to a size of 10 cm × 10 cm, and the cut piece was placed on a horizontal plate. The total height of the four corners of the sheet from the plate was measured.

Further, the synthetic paper was printed with a screen ink "Sericol CG" (produced by Teikoku Ink Seizo K.K.) using a bar coater #10 to an ink coating amount of 8 g/m$^2$ (solid basis) and allowed to stand at room temperature to dry. The printed sheet was cut to a size of 10 cm × 10 cm, and the cut piece was placed on a horizontal plate. The total height of the four conrers of the sheet from the plate was measured.

2) Offset Printability

Two-color offset printing on the synthetic paper was performed using an offset two-color printing machine manufactured by Mitsubishi Heavy Industries, Ltd. and an offset ink "TK Newmark V" (indigo blue and crimson) manufactured by Toyo Ink Mfg. Co., Ltd., and printing properties were evaluated in terms of ink drying properties, surface uneveness after drying, and set off (back stain) by the following methods.

a) Ink Drying Properties

Immediately after printing, the indigo solid-printed portion (100% dot) was cut out of the printed sheet, and a non-printed sheet of the same synthetic paper sample was superposed on the printed surface thereof. A pressure roller was rolled over the printed surface via the non-printed sheet under a load of 100 g using a Choyokai type printing ink drying tester (manufactured by Toyo Seiseiki K.K.), and the time required until the wet ink under a wide part of the pressure roller was not transferred to the non-printed sheet (setting time) was measured.

b) Surface Uneveness of Printed Sheet

Boundaries between non-printed areas and areas printed solid in each color (100% dot) and in two colors (200% dot) were visually observed from the back side of the printed sheet to see whether any unevenness occurred. The results were rated as follows.

Good . . . No unevenness observed.

Medium . . . Slight unevenness observed.

Poor . . . Obvious unevenness observed.

c) Back Stain 500 sheets of the synthetic paper were printed and piled on a plate, and the number of the sheets whose ink was not transferred to the back surface of the adjacent sheet was counted.

3) Pencil Writability

Writability was evaluated using a commercially available HB pencil under an ordinary writing pressure (200 g). Samples providing writing of sufficient density were rated "good", and those incapable of providing writing of sufficient density even under an increased writing pressure were rated "poor".

4) Opacity

Measured in accordance with JIS P-8138.

EXAMPLE 1

(1) Preparation of Base Layer

A mixture of 80% of polypropylene having a melt flow ratio (MFR) of 0.8 g/10 min, 8% of high-density polyethylene, and 12% of calcium carbonate having an average particle size of 1.5 μm was kneaded in an extruder at 270° C., extruded into sheeting, and cooled by a cooling apparatus to prepare an unstretched sheet. The sheet was heated at 140° C. and longitudinally stretched at a stretch ratio of 5. The resulting stretched sheet was designated Base Layer 1.

(2) Preparation of Laminate Base Film

A mixture of 51% of polypropylene having an MFR of 4.0 g/10 min and 49% of calcium carbonate having an average particle size of 1.5 μm was melt-kneaded in an extruder at 270° C. to obtain Compound (A). Separately, a maleic acid-modified polypropylene resin having a maleic acid content of 0.6% (MFR: 5.5 g/10 min) was melt-kneaded in an extruder at 270° C. to obtain Compound (B). Further, an ethylene-vinyl alcohol copolymer resin having an ethylene content of 46 mol % and an MFR of 6.0 g/10 min (melting point: 165° C.; degree of saponification: 96%) was melted in a separate extruder at 25° C. to obtain Compound (C). Compounds (A), (B), and (C) were fed to a three-layered die with Compound (B) as an intermediate layer and co-extruded on both sides of Base Layer 1 prepared as described above with the ethylene-vinyl alcohol copolymer as an outermost layer to obtain a 7-layered laminate sheet.

The resulting laminate was heated to 155° C. and transversely stretched at a stretch ratio of 7.5 to obtain a 7-layered stretched laminate base film having a total thickness of 150 μm, with the inorganic powder-containing polypropylene paper-like layers (2a, 2b) each being 20 μm thick, the ethylene-vinyl alcohol copolymer surface layers (3a, 3b) each being 15 μm thick, and the adhesive resin layers (3a', 3b') each being 10 μm thick. The resulting synthetic paper base film had an overall density of 0.80 g/cm$^3$, an opacity of 90%, and a surface smoothness (Bekk's index) of 8,000 seconds.

(3) Preparation of Synthetic Paper

A primer providing antistatic properties "Saftomer 3100" (produced by Mitsubishi Petrochemical Co., Ltd.) was coated on each side of the laminate base film obtained in (2) above to a thickness of 1 μm (solid), followed by drying at room temperature (about 20° to 30° C.) to form an anchor coat on each side. Then, a coating composition having the following formulation was coated on the anchor coat on each side to a thickness of 8 μm (solid) and dried at 70° C. for 1 minute to form a coat layer.

| Coating Formulation: | |
|---|---|
| Styrene-Butadiene Rubber Latex | 35 parts |
| Starch | 10 parts |
| Calcium Carbonate | 30 parts |
| Titanium Oxide | 10 parts |
| Clay | 60 parts |
| Dispersing Agent (sodium tripolyphosphate) | 0.5 part |
| Defoaming Agent (San-Nopco SN-DF-113) | 0.1 parts |

(4) Evaluation

The thus prepared synthetic paper was evaluated by the methods described above. The height of curling at the four corners of the sheet from the plate was 0 mm in offset printing and in screen printing.

The layer structure of the synthetic paper and the results of evaluations are shown in Tables 2 and 3 below, respectively.

COMPARATIVE EXAMPLE 1

Synthetic paper was produced in the same manner as in Example 1, except that the laminate base film did not include either the layer of Compound B (maleic acid-modified polypropylene film) or the layer of Compound C ethylene-vinyl alcohol copolymer film).

The laminate base film had an inorganic fine powder-containing polypropylene layer as its surface, a total thickness of 100 μm, an opacity of 90%, and a surface smoothness of 500 seconds.

The layer structure of the synthetic paper and the results of evaluations of this comparative paper are shown also in Tables 2 and 3, respectively. As shown in Table 3, when offset-printed in the same manner as in Example 1, the height of curling (the total thickness of the height of the four corners from the plate) was found to be 25 mm for the comparative synthetic paper.

COMPARATIVE EXAMPLE 2

Synthetic paper was produced in the same manner as in Example 1, except that the layer of Compound B (maleic acid-modified polypropylene film) and the layer of Compound C (ethylene-vinyl alcohol copolymer film) were replaced with an extruded film of molten polypropylene having an MFR of 4.0 g/10 min (Compound D).

The laminate base film had a total thickness of 120 μm, with the polypropylene film surface layers each being 10 μm thick, an opacity of 90%, and a surface smoothness of 8,000 seconds.

The layer structure of the synthetic paper and the results of evaluations are shown also in Tables 2 and 3, respectively. As shown in Table 3, when offset-printed in the same manner as in Example 1, the height of curling (the total thickness of the height of the four corners from the plate) was found to be 19 mm for this comparative synthetic paper.

EXAMPLES 2 TO 4

Synthetic paper was produced in the same manner as in Example 1, except that the extrusion rates of Compound B (maleic acid-modified polypropylene film) and Compound C (ethylene-vinyl alcohol copolymer film) were varied to achieve the layer thicknesses as shown in Table 2 below.

The layer structure of the synthetic paper and the results of evaluations are shown also in Tables 2 and 3, respectively.

COMPARATIVE EXAMPLE 3

Synthetic paper was produced in the same manner as in Example 1, except the thickness of the ethylene-vinyl alcohol copolymer film (Compound C) was changed to 3 μm.

The layer structure of the synthetic paper and the results of evaluations are shown below in Tables 2 and 3, respectively.

EXAMPLE 5

Base Layer 1 was prepared in the same manner as in Example 1. A mixture of 51% of polypropylene having an MFR of 4.0 g/10 min and 49% of calcium carbonate having an average particle size of 1.5 μm was melt-kneaded in an extruder at 270° C. to obtain Compound (E). Compound (E) was extruded on one side of Base Layer 1 and, at the same time, the three layers of Compounds (A), (B) and (C) as described in Example 1 were co-extruded through a three-layered die on the other side of Base Layer 1 to obtain a five-layered laminate base film with the ethylene-vinyl alcohol copolymer film as the outermost layer.

The laminate was heated to 155° C. and transversely stretched at a stretch ratio of 7.5 to obtain a stretched 5-layered laminate base film. The resulting laminate base film had a total thickness of 125 μm, with the layer (3a') (Compound B) being 10 μm thick, and the layer (3a) (Compound C) being 15 μm thick.

Offset- or screen-printing was carried out on the ethylene-vinyl alcohol copolymer side of the synthetic paper in the same manner as in Example 1. The height of curling was 0 mm in each case.

The layer structure and the results of evaluations are also shown in Tables 2 and 3, respectively.

In Table 2 below, the abbreviation "EVAlc" means an ethylene-vinyl alcohol copolymer, and the abbreviation "PP" means polypropylene.

TABLE 2

| | | Laminate Base Film | | | | | | | | |
|---|---|---|---|---|---|---|---|---|---|---|
| | | | Paper-Like Layer (2) Inorganic Fine Powder-Containing PP | | Top Layer (3) | | | | Anchor Coat Layer | |
| | Total Thickness | Base | | | Surface | | Back | | Saftomer | PP |
| Example No. | Laminate Base Film | Layer (1) | Surface (2a) | Back (2b) | Adhesive Layer (3a') | EVAlc Layer (3a) | Adhesive Layer (3b') | EVAlc Layer (3b) | 3100 (4) | Layer (5) |
| Example 1 | 150 | 60 | 20 | 20 | 10 | 15 | 10 | 15 | 1 | — |
| Compar. Example 1 | 100 | 60 | 20 | 20 | — | — | — | — | 1 | — |
| Compar. Example 2 | 120 | 60 | 20 | 20 | — | — | — | — | 1 | surface: 10 back: 10 |
| Example 2 | 150 | 60 | 20 | 20 | 5 | 20 | 5 | 20 | 1 | — |
| Example 3 | 150 | 60 | 20 | 20 | 20 | 5 | 20 | 5 | 1 | — |
| Example 4 | 130 | 60 | 20 | 20 | 10 | 5 | 10 | 5 | 1 | — |
| Compar. Example 3 | 126 | 60 | 20 | 20 | 10 | 3 | 10 | 3 | 1 | — |
| Example 5 | 125 | 60 | 20 | 20 | 10 | 15 | — | — | 1 | — |

TABLE 3

| | | | Height of Curling | | Offset Printability | | | |
|---|---|---|---|---|---|---|---|---|
| Example No. | Appearance | Opacity (%) | Offset Printing Ink (mm) | Screen Printing Ink (mm) | Ink Drying Properties (minutes) | Surface Unevenness | Number of Back Stain-Free Prints | Pencil Writability |
| Example 1 | art paper-like | 90 | 0 | 0 | 20 | good | 480 | good |
| Compar. Example 1 | matte paper-like | 90 | 25 | 15 | 20 | poor | 50 | good |
| Compar. Example 2 | art paper-like | 90 | 19 | 10 | 20 | poor | 50 | good |
| Example 2 | art paper-like | 90 | 0 | 0 | 20 | good | 490 | good |
| Example 3 | art paper-like | 90 | 0 | 0 | 20 | good | 400 | good |
| Example 4 | art paper-like | 90 | 0 | 0 | 20 | good | 430 | good |
| Compar. Example 3 | art paper-like | 90 | 3 | 3 | 20 | medium | 250 | good |
| Example 5 | Surface: art paper-like Back: matte paper-like | 90 | 0 | 0 | 20 | poor | 100 | good |

The synthetic paper according to the present invention with a coat layer on its surface is easy to write on with pencils. Further, the synthetic paper of the present invention with an ethylene-vinyl alcohol copolymer layer for preventing solvents in offset inks or gravure printing inks from penetrating into the polyolefin film does not suffer from solvent attach when printed on the coat layer thereof with a GP offset ink or a gravure printing ink, that is, local unevenness or overall curling of the printed synthetic paper scarecely occurs.

While the invention has been described in detail and with reference to specific examples thereof, it will be apparent to one skilled in the art that various changes and modifications can be made therein without departing from the spirit and scope thereof.

What is claimed is:

1. A synthetic paper comprising
   (a) a finely porous polyolefin film layer having an opacity of at least 80% obtained by stretching a polyolefin film containing from 8 to 65% by weight of an inorganic fine powder;
   (b) a stretched ethylene-vinyl alcohol copolymer film layer on one or both sides of the polyolefin film layer (a); and
   (c) a coat layer on at least one of the stretched ethylene-vinyl alcohol copolymer film layers (b).

2. The synthetic paper as claimed in claim 1, wherein said ethylene-vinyl alcohol copolymer has an ethylene content of from 30 to 70% by weight and a degree of saponification of at least 90%.

3. The synthetic paper as claimed in claim 1, wherein said finely porous polyolefin film layer (a) has a microvoid volume of from 20 to 60%.

4. The synthetic paper as claimed in claim 1, wherein said finely porous polyolefin film layer (a) has a thickness of from 40 to 500 $\mu$m, said stretched ethylene-vinyl alcohol copolymer film layer (b) has a thickness of from 3 to 30 $\mu$m, and said coat layer (c) has a thickness of from 2 to 25 g/m$^2$ (solid base).

5. The synthetic paper as claimed in claim 1, wherein said synthetic paper includes a plurality of ethylene-vinyl alcohol copolymer film layers (b) on said polyolefin film layer (a).

6. The synthetic paper as claimed in claim 5, wherein said synthetic paper includes a plurality of coat layers (c).

7. A method of printing on synthetic paper as claimed in claim 1 with an offset ink, wherein said offset ink comprises from 15 to 50 parts by weight of a pigment, from 25 to 30 parts by weight of a resin, from 10 to 15 parts by weight of a drying oil, from 20 to 45 parts by weight of a high-boiling petroleum solvent, from 0.5 to 2 parts by weight of a dryer, and from 2 to 5 parts by weight of other additives based on 100 parts by weight of the offset ink, said method comprising contacting said synthetic paper with a printing plate inked with said offset ink to transfer said offset ink to said synthetic paper.

* * * * *